Dec. 6, 1960 J. P. JONES 2,962,803

APPARATUS AND METHOD FOR ENCAPSULATION OF MAGNETIC CORES

Filed April 25, 1955 2 Sheets-Sheet 1

*INVENTOR.*
JOHN PAUL JONES

*BY*

Carl Fissell Jr.
AGENT

APPARATUS AND METHOD FOR ENCAPSULATION OF MAGNETIC CORES

Filed April 25, 1955 2 Sheets-Sheet 2

INVENTOR.
JOHN PAUL JONES

BY

Carl Fissell Jr.
AGENT

United States Patent Office 2,962,803

Patented Dec. 6, 1960

2,962,803

APPARATUS AND METHOD FOR ENCAPSULATION OF MAGNETIC CORES

John Paul Jones, Pottstown, Pa., assignor to Burroughs Corporation, Detroit, Mich., a corporation of Michigan Filed Apr. 25, 1955, Ser. No. 503,713

4 Claims. (Cl. 29—155.56)

This invention relates to apparatus and methods for insulatingly protecting small articles of manufacture such as magnetic cores and, more particularly, to apparatus and a method for protectingly sheathing magnetic core bobbins in a sleeve or tube of dielectric material.

In certain electronic equipment such as calculating machines, computers and the like, it is often advantageous, in order to increase operating efficiency and to take advantage of the relatively limited available space in such devices, to employ small magnetic cores as the storage elements in the memory arrays utilized therein. Such cores can take a variety of individual shapes and forms depending upon the particular circuit requirements and the electrical environment in which the core is to be utilized.

A well-known core shape used for the purposes outlined above comprises a ceramic bobbin having a hollow axial bore and having an individual shoulder or rim at each opposite end thereof defining a recessed hub portion therebetween. Certain desired electromagnetic properties result from the addition to the ceramic bobbin of a predetermined number of turns or wraps of magnetizable strip material which is secured around the hub between the rims. During the wrapping process the layers of magnetizable material may be coated with a paste of magnesium oxide and oil to form an insulating layer therebetween. The wrapped material is relatively fragile and is extremely thin, being on the order of one mil or less. Generally, the number of wraps per bobbin is usually insufficient to fill the recess between the hub and the edges of the bobbin rims. Any rough, careless or unusual handling of the core at this stage in its fabrication will tend to deform the wraps, or, if the handling pressures are too great the turns of the wrap could be easily shorted together. Furthermore, the electromagnetic characteristics of the core may be upset or destroyed entirely due to the deleterious effects of moisture, heat, corrosive gases and foreign particles.

It is an important object of the invention to provide a relatively inexpensive and efficient method for protectingly packaging small magnetic cores.

It is a still further important object of the present invention to provide a simple, inexpensive and efficient apparatus for encapsulating small magnetic cores.

It is another important object of the invention to provide a novel method of producing plastic encapsulated articles of manufacture.

It is an additional object of the invention to provide a novel means for insulatingly sheathing small toroids in a snug fitting plastic sleeve and sealing the same from the atmosphere.

In accordance with the invention, there is provided encapsulation apparatus for attaining the foregoing as well as other objects comprising, a hollow cylindrical tube or sleeve spreader having an axial bore and a relatively wide flange forming a handle at one end thereof. The opposite end of the tube spreader is provided with a frusto-conical lip which is receivable within the open end of a tube or sleeve of dielectric material. A plunger or ram rod is adapted to be received through the hollow bore of the spreader. One end of the ram rod is provided with a reduced end portion adapted to mount the articles to be inserted into the tube for encapsulation therein. The outside diameter of the frusto-conical lip of the tube spreader is dimensionally shaped to dilate or distend the insulating tube into which it is to be received so that the core bobbin can be slidably inserted into the tube material as the ram rod is moved through the bore of the tube spreader. Once the core or other object has been inserted within the insulating sleeve and the spreader and ram rod removed therefrom, the plastic sleeve is cut at the opposite ends of the core exposing the end portions of the bobbin. Thereafter, the exposed ends of the core may be coated with a sealing compound which is adapted to anneal itself to the sleeve material and thus seal the core from the surrounding atmosphere.

Other objects and advantages of the present invention will appear from a reading of the detailed description set forth hereinafter, the description being by way of illustration and explanation only, and not by way of limitation and wherein the accompanying drawings illustrate a preferred embodiment of the apparatus in which:

Fig. 1 is an isometric view of an encapsulating apparatus according to the invention.

Figs. 2 through 5 inclusive are isometric views of the apparatus of Fig. 1 illustrating successive steps in encapsulation of a magnetic core bobbin within a plastic tube or sleeve in accordance with the invention;

Figure 8:
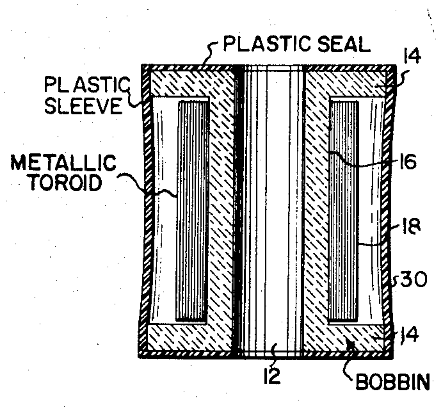
Fig. 8 is an enlarged sectional view diametrically through a magnetic core encapsulated in accordance with the teachings of this invention; and, Fig. 9 is an isometric view of a completed magnetic core assembly including electrical operating windings thereon.

A completely encapsulated magnetic core assembly according to the invention is illustrated in the sectional side elevational view of Fig. 8. In the illustrated embodiment the complete magnetic core assembly comprises a non-magnetic supporting bobbin 10 of lightweight refractory material such for example as ceramic. The bobbin material is a matter of choice determined in part by the desired shape or configuration which the bobbin structure is to assume and in part by the space allotment available for the core assembly. The bobbin illustrated herein by way of example may be provided with a hollow axial bore 12 and lateral projecting shoulders or rims 14—14 at the opposite ends thereof defining a recessed area or hub 16 therebetween. The recessed area between the rims is adapted to receive a plurality of turns or wraps of any electrically conductive magnetizable strip material 18 forming a metallic toroid therearound. In the illustrated embodiment of the invention, as is evident in Fig. 8, the wraps of the metallic toroid do not completely fill up the recessed area 18 of the bobbin. A slight vacant area or clearance remains from the periphery of the wrapped material 18 to the outer periphery of the two rims 14—14.

The magnetizable strip wrapping material, which is extremely thin, being on the order of one mil or less, is delicate and easily deformed or broken due to careless or rough handling. The individual turns of the wrapped material are insulatingly coated during manufacture with a mixture of magnesium oxide and oil after which the wrapped core is heat annealed. The applied heat, among other things, tends to draw off the solvents in the oil mixture and leaves a finely divided insulating coating which is separatingly disposed between each of the various layers of the metallic toroid. Once the wraps of magnetizable material have been applied to the bobbin and the protecting sheath, now to be described, has been applied, a plurality of electrical conductors 42 may be threaded through the bore of the core and around and about the sheathed core to form a complete magnetic core assembly or component 44 as shown clearly in Fig. 9. In this form the magnetic core is thereby adapted for utilization in electrical circuits of computers, business machines and the like.

Figure 1:
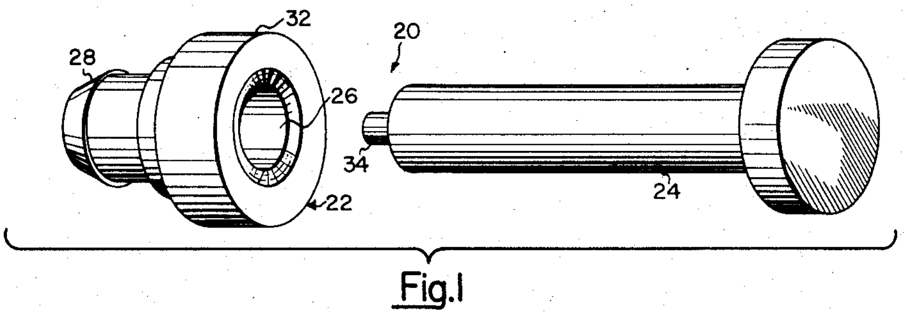
Figure 2:
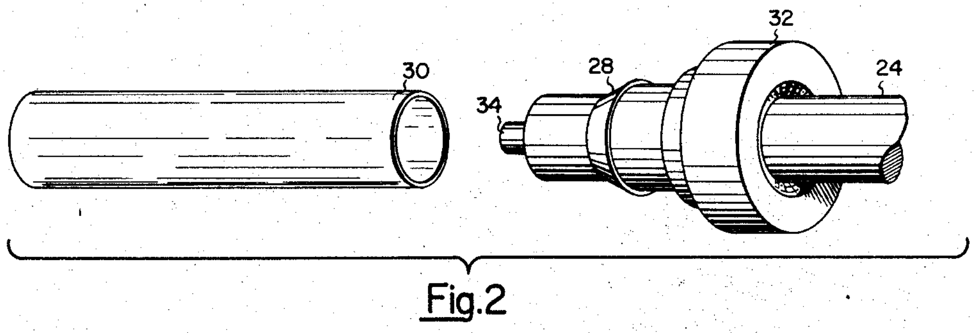

A novel means capable of protecting the wrapped core and of overcoming the disadvantages earlier described, and one which will provide a simple, inexpensive and readily fabricated assembly that is sturdy and moisture proof, is illustrated in Fig. 1 of the drawings. The encapsulation apparatus is generally referred to by the reference character 20 and comprises two separate sub-assemblies namely, a tube or sleeve spreader or dilator 22 and a ram rod 24 telescopically receivable therein. The dilator 22 comprises a slightly elongated body having an axial bore 26 of constant diameter extending centrally therethrough. One end portion of the dilator is reduced as indicated at 22 and is provided with a tapered rearwardly slanting dilating shoulder or lip 28 for expanding the internal diameter of an insulating tube 30, Fig. 2, as will be described later on. The opposite end portion of the dilator 22 is enlarged as at 32 to provide handling means therefor. The ram rod or plunger 24, having a radial dimension for a sliding fit with the inside dimension of the dilator 22, is slidably telescopically receivable within the bore 26 thereof. The plunger is of sufficient length so that when it is received within the dilator it can extend completely through the bore of the dilator and project outwardly beyond both end portions thereof as is evident in Fig. 3. This feature provides for ease of insertion and removal of the ram rod. One end portion of the ram rod 24 is also reduced as indicated by the reference character 34 and as clearly shown in Figs. 1 through 4 inclusive. The reduced end portion 34 is of a diameter relative to the axial bore of the bobbin to fit loosely through the bore and to thereby support the bobbin during the encapsulation procedure.

Conventional, well-known spaghetti tubing, usually made of plastic material and ordinarily used as wire insulating material in radio and electronic equipment, is employed in the present invention to provide a relatively inexpensive and readily obtainable dielectric protecting sheath or sleeve for the bobbin. The spaghetti tubing 30, of proper internal radial dimensions to tightly or snugly fit a bobbin of selected size, is conveniently adapted for use with the present apparatus by virtue of its semi-rigid yet yielding pliability. The use of tubing as an insulating sleeve for the core bobbin offers simple yet efficient protection for the bobbin body and thus for the metallic toroid which is disposed around the hub thereof. Whereas an insulating coating, applied by spraying or dipping techniques, would tend to hug the wrapped material quite closely and thus tend to transmit external forces and handling pressures thereto which would be generally quite harmful, the tubing or sleeve is spaced away from the wrapped material a slight distance due to the rims of the bobbin and the fact that the metallic toroid does not extend outwardly from the bobbin hub to the periphery of the bobbin rims. The tubing although resilient and therefore pliable has an inherent rigidity or resistivity to lateral or radial deformation or compression and thus while the tube section on the bobbin may be compressed or dented slightly as the result of external forces, it still offers sufficient resistance to such forces as to prevent any penetration thereof to the metallic wrap.

The step-by-step operational views of Figs. 1 through 5 inclusive illustrate an encapsulation method and one form of apparatus for its accomplishment according to the present invention. The various views will be described simultaneously. A magnetic core bobbin 10 as earlier described with reference to Fig. 8, of suitable dielectric material such as ceramic, having hubs or rims disposed at opposite ends thereof and a hollow axial bore therethrough is provided with a plurality of wraps 18 of magnetizable material which are wound around the hub. The last two turns of the wrapped material may be fastened together as by welding to prevent the accidental dislodgement or unwinding of the strip therefrom.

Figure 3:
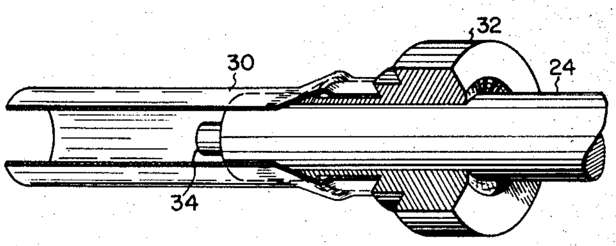

The ram rod 24 has its reduced end portion 34 inserted within the open end of a length of readily available spaghetti tubing 30. The tubing may be vinyl acetate or other similar dielectric plastic material. The dilator 22 is then received over the ram rod and pushed forward against the leading edge of the insulating tubing. The reduced end portion of the ram rod is then advanced well into the tubing, supporting the tubing radially so that the frusto-conical lip 28 of the dilator may be pushed against the edge of the tubing to permit the lip to lift the edge of the tubing and force the tubing to ride up on the rearwardly slanting shoulder of the dilator. The resulting position of the parts at this step is shown in Fig. 3. In this manner the dilator is received well within the end of the tubing. The ram rod 24 is then withdrawn from the tubing and the dilator.

Figure 4:
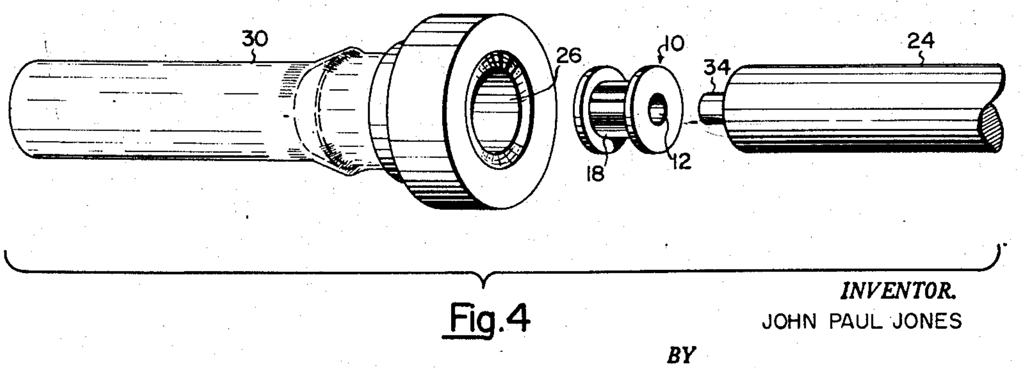
Figure 5:
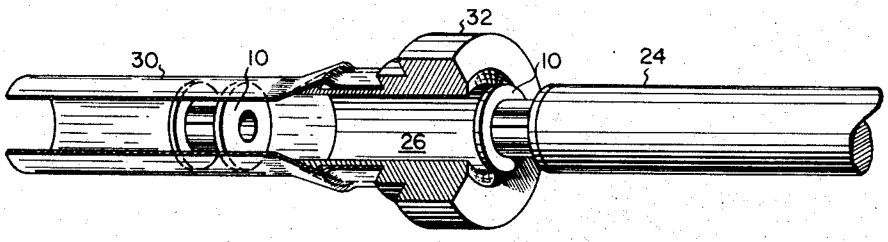
Figure 6:
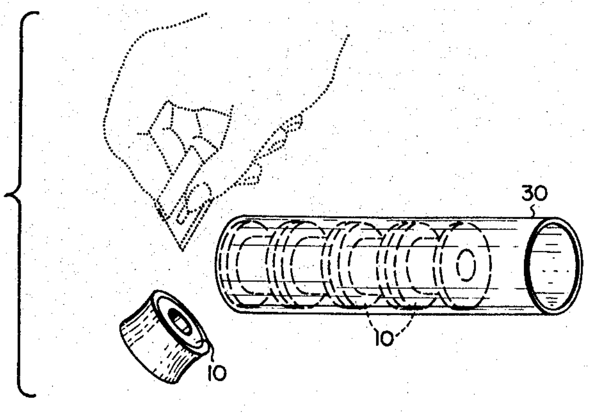
Fig. 6 is a diagrammatic representation illustrating one manner of separating the individual core bodies from one another.

A magnetic core bobbin 10 such as the one shown in Fig. 4 is slipped onto the reduced end portion 34 of the ram rod. The ram rod with the bobbin thereon is once more inserted into the dilator, and is then advanced well into the tubing so that the tubing contractually snugly surrounds the bobbin. The rod is then withdrawn from the tubing and dilator leaving the bobbin in the tubing as shown in Fig. 5. Another bobbin is placed on the reduced end portion of the ram rod and the operation repeated until the desired number of bobbins has been inserted within the insulating tube or sleeve 30. The cores may be pushed into the tubing 30 in batches of three or four or more. The tubing is then slipped back off the spreader or conversely the spreader is withdrawn from the tubing. The tubing is then sliced into sections each of which contains a core. The slicing action may be manually performed with a razor blade in the manner illustrated in Fig. 6.

Figure 7:
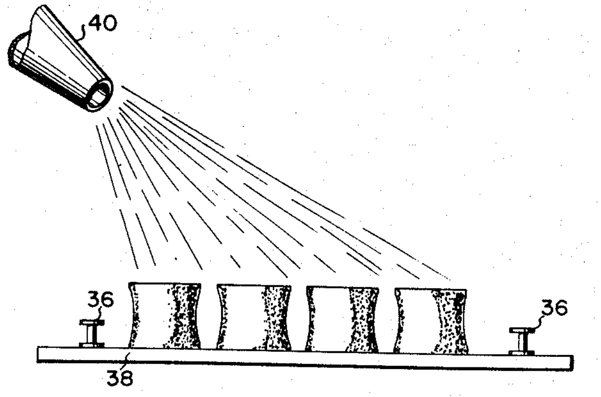
Fig. 7 is an isometric view illustrating the manner of sealing the exposed ends of the core as taught by the invention.

In order to protect the ends of the cores exposed by the slicing operation, a covering may be applied thereto in any suitable fashion such as by means of dipping or by the spraying technique shown in Fig. 7. For this latter operation, a number of cores are disposed in rows on a series of vertically projecting terminals 36 which are mounted on a base 38 and act as supporting pedestals for the core bobbins. Insulating material in the form of a spray may then be applied to the core bodies in mass formation by a sweeping motion of a spray gun 40 which is repeatedly passed back and forth over the cores coating the upper exposed ends of the cores. The sprayed material is permitted to cool after which the individual core bodies are inverted and repositioned on the pedestals 36 and the spraying operation is repeated to coat the opposite ends of the cores.

Figure 9:
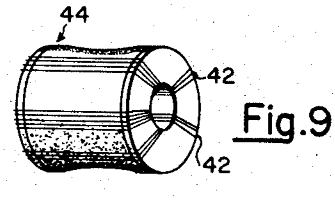

A core body which has been encapsulated by means of the foregoing method and apparatus is shown in Fig. 8. The sides and opposite end portions of the core are completely sealed in a plastic envelope. The ends of the bore 12 of the core are left open and through the bore the turns of one or more windings 42 may be extended as shown in Fig. 9. Cores prepared in this manner above described have been tested both before and after immersion in water from periods ranging from an hour to twenty-four hours in length and show no deleterious effects. The encapsulated core bodies have also been heat cycled at a temperature of 125° C. with little or no harm to the core bobbin.

There has thus been described a novel encapsulating method and apparatus which provides a protective insulating covering for small articles of manufacture; which provides high mechanical resistance to external forces as well as ease of handling; and which incorporates the advantages of moisture resistance, corrosive gas resistance, as well as resistance to the ingress of foreign particles such as dirt, etc. It is also apparent that the apparatus and method set forth herein above provides novel means for decreasing the sealing time in the production of small insulated magnetic cores.

What is claimed is:

1. Apparatus for encapsulating toroidal magnetic cores in an insulating sheath comprising, an elongated body having an axial bore of constant diameter extending centrally therethrough and providing guiding means for the passage of said cores, one end portion of said body forming a handling portion for said body, the outwardly facing end of said handling portion being annularly beveled to form a guideway leading into said bore, the opposite end of said body being provided with a conical lip extending backwardly from the end thereof and being flared outwardly to form a dilating shoulder for expanding an open end portion of a dilatable tube upon insertion of the shoulder in said tube, and an elongated plunger slidable within and through said bore, one end of said plunger being provided with a portion of reduced diameter providing a projecting mandrel upon which cores are carried for insertion within said bore and for moving the cores through the bore and into said tube for encapsulation therein.

2. Apparatus for encapsulating magnetic cores in a tubular insulating sheath comprising, an elongated body, said elongated body having a smooth uniform axial bore extending centrally therethrough of a diameter substantially equal to the external diameter of said magnetic cores, one end of said body being of a reduced diameter with a sharply tapered rim extending backwardly and outwardly from the end thereof thereby providing means for entering and enlarging one end of said insulating tube, the opposite end of said body having an enlarged portion serving as a handle therefor, said body being provided with an intermediate grooved portion interconnecting said rim and said enlarged handle portion thereby providing a rigid supporting surface area around which said tube is contractually engaged when said tube end is engaged thereover, and an elongated plunger member slidably receivable within and through the bore of said body, said plunger member having an enlarged portion at one end thereof serving as a handle therefor, the opposite end of said plunger being of a reduced diameter so as to be receivable within the bore of a magnetic core for supporting the latter while sliding the same through the bore of the elongated body and into said tube.

3. The method of sheathing magnetic cores within an insulating semi-rigid plastic tube which comprises the steps of introducing one end of a core supporting mandrel carrying a tube dilator thereon into the open end of the plastic tube which is of slightly less diameter than the magnetic cores to be sheathed therein, sliding the tube dilator along said mandrel and into abutting contact with the said end of said tube, forcing the tube end to ride up over the leading end of the dilator whereby the diameter of the tube is slightly increased, withdrawing the mandrel from the dilator, thereafter supporting cores to be sheathed onto said one end of the mandrel and passing the core-carrying mandrel through the dilator and forceably into said tube thereby to protectingly sheath the core, withdrawing said mandrel from said core leaving the core within said plastic tube, and finally severing the tube portion sheathing the magnetic core from the remainder of said tube.

4. The method of encapsulating annular magnetic cores which comprise the steps of, introducing one end of a tubular dilator into the open end of a semi-rigid plastic tube of slightly less diameter than the core to be sheathed therein, causing said tube end to ride up upon the end of the dilator thus to flare open the tube end, placing a magnetic core upon the core supporting end of a mandrel, sliding said core-carrying mandrel through the dilator and forcibly into said tube to protectingly sheath the core, removing said mandrel and repeating the last step successively, bringing the successively inserted cores into substantial abutment, severing the plastic tube into sections, each one of which contains a core with the ends of the core exposed and thereafter applying a sealing spray to the exposed ends of each sheathed core thereby to completely encapsulate the cores.

References Cited in the file of this patent

UNITED STATES PATENTS

| | | |
|---|---|---|
| 661,073 | Paulitschke et al. | Nov. 6, 1900 |
| 1,348,005 | Hirst | July 27, 1920 |
| 1,633,110 | Koons | June 21, 1927 |
| 1,865,444 | Recker et al. | July 5, 1932 |
| 1,968,792 | Yeomans | July 31, 1934 |
| 2,208,732 | Powell | July 23, 1940 |
| 2,218,904 | Burd | Oct. 22, 1940 |
| 2,450,727 | Haushalter | Oct. 5, 1948 |
| 2,467,101 | Walters | Apr. 12, 1949 |
| 2,506,657 | Webster | May 9, 1950 |
| 2,623,920 | Ford | Dec. 30, 1952 |
| 2,677,880 | Ballard | May 11, 1954 |
| 2,687,566 | Hall | Aug. 31, 1954 |